April 17, 1951
C. C. TAYLOR
2,549,141
COMBINED TURNING AND THREAD CUTTING DEVICE
Filed Aug. 12, 1946
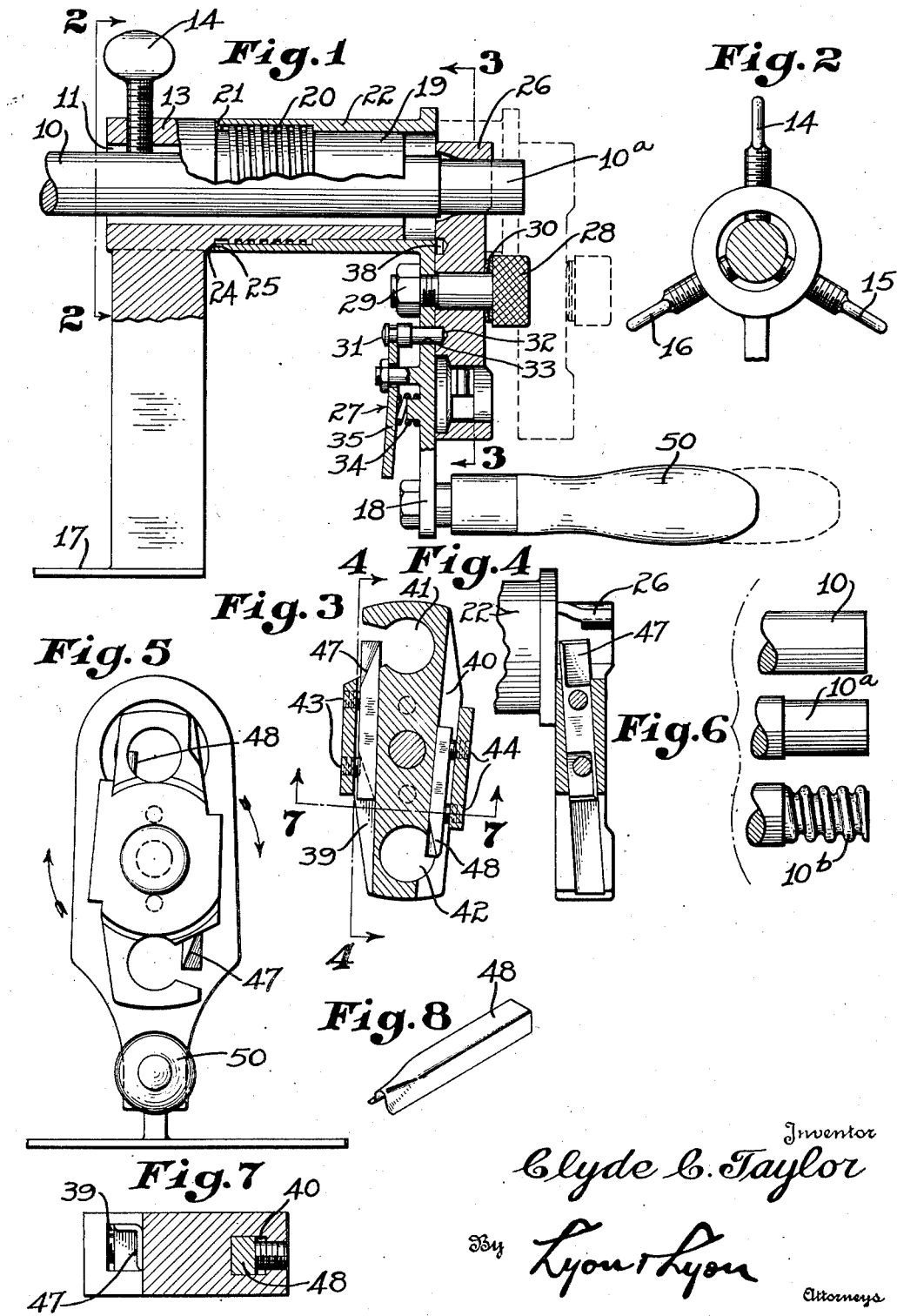
Inventor
Clyde C. Taylor
By Lyon & Lyon
Attorneys Patented Apr. 17, 1951

2,549,141

UNITED STATES PATENT OFFICE 2,549,141

COMBINED TURNING AND THREAD-CUTTING DEVICE

Clyde C. Taylor, Santa Ana, Calif., assignor to Kenneth Wade and Floyd W. Robinson, both of Garden Grove, Calif.

Application August 12, 1946, Serial No. 690,017

1 Claim. (Cl. 10—109)

The present invention relates broadly to thread cutting devices, and in particular to devices for cutting screw threads in the ends of wooden mop handles, broom handles and the like.

Wooden screw threaded handles are used to a large extent as an attachment to the many varieties of cleaning devices such as brooms, mops, carpet sweepers and the like used in large quantities in residences, apartments, railroads, hotels. Oftentimes these wooden handles break for one reason or the other thereby rendering the associated cleaning device useless until another handle is provided.

It is therefore an object of the present invention to provide a simple device allowing the repair or complete fabrication of a screw threaded handle in an easy, simple, quick, and inexpensive manner.

Another object of the present invention is to provide a simple device for cutting threads in the end of a wooden handle, either directly or after initial trimming of the handle to a desired diameter.

Another object of the present invention is to provide a thread cutting device characterized by its simplicity.

Although the thread cutting device is described above in connection with the repair of broken handles it is evident that its usefulness is not limited thereto but may be used to great advantage in the fabrication of new handles.

The features of the present invention which are believed to be novel are set forth with particularity in the appended claim. This invention itself, both as to its organization and manner of operation, together with further objects and advantages thereof, may best be understood by reference to the following description taken in connection with the accompanying drawings in which:

Figure 1 is a view in side elevation, partly in section, of a thread cutting device incorporating the present invention.

Figure 2 is an end view of a portion of the device shown in Figure 1 as indicated by the line 2—2 therein.

Figure 3 is a sectional view taken substantially on line 3—3 of Figure 1.

Figure 4 is a sectional view taken substantially on line 4—4 of Figure 3.

Figure 5 is a view in end elevation looking in towards the handle end of the device shown in Figure 1, but with the tool holder inverted with respect to its position shown in Figure 1.

Figure 6 shows the shape of a wooden rounded handle in successive steps of operations performed thereon by the device shown in Figure 1.

Figure 7 is a sectional view taken substantially on line 7—7 of Figure 3.

Figure 8 is a perspective view of the grooving tool mounted in the device of Figure 1.

In Figure 1 a wooden handle 10 which is to be screw threaded at one end thereof is inserted through the longitudinally extending opening 11 of the stationary work holder and tool guiding member 13 within which it is clamped by means of the three equally radially spaced clamping members 14, 15, and 16 which are screw threadably mounted in work holder 13 to releasably engage and clamp the wooden handle 10. The work holder 13 has a convenient integrally formed base 17 adapted to be fastened to a table, bench or the like.

The work holder 13 serves also to support the crank member 18 for both rotative movement and movement longitudinally of the work holder. For this purpose the work holder 13 is provided with a cylindrical extension 19 having raised screw threads 20 formed thereon which are arranged to cooperate with a screw thread 21 less than a full turn on the interior of the cylindrical hollow extension 22 of crank member 18. The outer diameter of the work holder extension 19 is slightly less than the inner diameter of the cylindrical crank member extension 22 so as to provide a suitable bearing for rotative movement of the crank member 18.

When the crank member 18 is rotated, threads 20 and 21 cooperate to move the crank member 18 transversely from its position indicated in dotted lines in Figure 1 to its position indicated in full lines. It is noted that adjacent the inner end of the screw threaded portion 20 is a re-entrant portion within which the half screw thread 21 on crank member extension 22 may freely rotate at the end of transverse movement of crank member 18 to thereby prevent binding between screw threads 20 and 21 and to allow the crank member 18 to rotate freely with the cooperating faces 24 and 25 of members 13 and 22 respectively in abutment to limit further longitudinal movement of the crank member 18.

It is thus seen that the crank member 18 may be rotated on the work holder 13 and may be moved longitudinally from its dotted position shown in Figure 1 to its full line position upon rotation of the crank member 18.

Crank member 18 has pivotally mounted thereon a rectangularly shaped tool holder 26 which may be maintained in one of its two adjusted positions with respect to crank member 18 by means of the releasable spring biased detent means 27. That is, the rectangularly shaped tool holder 26 is pivotally mounted at a point intermediate its ends on the crank member 18 by means of a circular fastening bolt 28 which passes through tool holder 26 and crank member 18 and carries the fastening nut 29 on its free end, opposite faces of the tool holder 26 and crank member 18 being pressed together by means of the spring type washer 30 disposed between the shoulder of bolt 28 and the tool holder 26.

In the position shown in Figure 1 the tool holder 26 is locked in position with respect to the crank member 18 by the moveable pin 31 cooperating with the hole 32 in tool holder 26, the pin 31 which passes through the aperture 33 in crank member 18 being spring pressed into the hole 32 by means of compression spring 34 acting on the pivoted release lever 35.

It is evident that the tool holder 26 may be moved from its locked position by pressing the bottom end of the pivoted lever 35 to the right in the direction of the crank member 18 to thereby withdraw the pin 31 from the hole 32. In such case (in the absence of the wooden handle 10) the tool holder 26 may be rotated through an angle of 180° until the pin 31 is in registry with the other locking hole 38 in tool holder 26. That is, in one of the locked positions of tool holder 26, pin 31 is in hole 32, while in the other one of the locked positions of tool holder 26, pin 31 is in hole 38. These two locked positions correspond respectively to the positions of the tool holder 26 in Figures 1 and 5.

As seen in Figures 3, 4 and 7 the tool holder 26 is generally rectangular in shape and has holes 41 and 42 extending therethrough in opposite ends thereof. Also, the tool holder 26 has a pair of tool channels 39, 40 formed in opposite sides thereof in communication respectively with the holes 41, 42. Releasable means comprising set screws 43, 44 are arranged to engage and lock the tools 47 and 48 respectively within channels 39 and 40 with the cutting end of the corresponding tool within or adjacent to the circular holes 41 and 42.

Tool 47 is a gouging tool inclined towards the work as indicated in Figure 4, while the other tool 48 is a grooving tool of the type shown in Figure 8 and is inclined as is the gouging tool 47. The gouging tool 47 is moved in the longitudinal direction of the handle 10 upon rotation of the crank member 18 so as to engage and cut it to a pre-determined diameter and after such engaging action the handle 10 is changed from the dimensions shown in the upper portion of Figure 6 to the dimensions shown on the modified handle end 10a in Figure 6. After such gouging action performed by tool 47, the crank member 18 is rotated in the opposite direction to cause separation of the work holder 13 from the crank member 18.

After such separation, the tool holder 26 is released from its locked position by actuation of the locking means 27 and is then rotated 180° and locked in such adjusted position wherein the grooving tool 48 occupies substantially the same position which the gouging tool 47 formerly occupied.

Thus, after the grooving tool 48 is locked in the position shown in Figure 5 the crank member 18 is re-threaded on the tool holder extension 19 and then rotated, with the result that the grooving tool 48 cuts the thread shown in the modified handle end 10b in Figure 6.

After cutting the screw thread in the handle end 10b, the crank member 18 is rotated in reverse direction to thereby move it in its transverse direction a distance sufficient to allow the finished handle end to be removed after unlocking the work locking means 14, 15 and 16.

It is apparent that the crank member 18 may be rotated by conventional means to perform the operations described above and preferably the crank member 18 is actuated by using the handle 50 attached thereto at its free end.

While the particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

A thread cutting device comprising a work holding member, a tool carrying member supported by said work holding member and being threadedly engaged therewith for concurrent rotary and axial movement thereon relative to a first axis, a radially extending arm on said tool carrying member, a tool holder pivoted to said arm on an axis radially displaced from said first axis, said tool holder having work embracing guide holes therethrough whose centers are spaced from said radially displaced axis a distance equal to the spacing between said axes, said tool holder also having tool channels each being in communication with one of said holes, releasable means on said tool holder arranged to lock a tool in each of said channels with its work engaging portion extending into the corresponding opening, and releasable detent means on said arm engageable with said tool holder at any one of a plurality of spaced positions to hold the same against rotation about said radially displaced axis whereby said tool holder may be indexed to selectively position said guide holes concentric to said first axis.

CLYDE C. TAYLOR.

REFERENCES CITED

The following references are of record in the file of this patent:

UNITED STATES PATENTS

| Number | Name | Date |
| --- | --- | --- |
| 8,806 | Owen | Mar. 16, 1852 |
| 9,547 | Griffith | Jan. 18, 1853 |
| 188,010 | Hazelton | Mar. 6, 1887 |
| 509,878 | Curtis | Dec. 5, 1893 |
| 771,016 | Ingram | Sept. 27, 1904 |
| 873,886 | McClay | Dec. 17, 1907 |
| 897,576 | Bocorselski | Sept. 1, 1908 |
| 1,340,972 | Monneman | May 25, 1920 |
| 1,820,792 | Funchess | Aug. 25, 1931 |
| 1,823,959 | Steinmayer | Sept. 22, 1931 |
| 1,868,750 | Jenkins | July 26, 1932 |
| 2,119,014 | Kimlin | May 31, 1938 |
| 2,351,217 | Kopp | June 13, 1944 |